(12) United States Patent
Hong et al.

(10) Patent No.: US 7,548,296 B2
(45) Date of Patent: Jun. 16, 2009

(54) LIQUID CRYSTAL DISPLAY DEVICE

(75) Inventors: Young Gi Hong, Gumi-si (KR); In Yong Jung, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 258 days.

(21) Appl. No.: 11/599,438

(22) Filed: Nov. 15, 2006

(65) Prior Publication Data

US 2007/0126972 A1    Jun. 7, 2007

(30) Foreign Application Priority Data

Dec. 7, 2005    (KR) .................... 10-2005-0118771

(51) Int. Cl.
*G02F 1/1345* (2006.01)
(52) U.S. Cl. ...................... 349/152; 349/150
(58) Field of Classification Search .................. 349/152
See application file for complete search history.

(56) References Cited

U.S. PATENT DOCUMENTS 6,297,868 B1 * 10/2001 Takenaka et al. ............ 349/151
6,853,428 B2 * 2/2005 Han et al. ..................... 349/139
7,023,517 B2 * 4/2006 Song et al. .................. 349/150
2002/0044242 A1 * 4/2002 Kim ............................ 349/139
2005/0128417 A1   6/2005 Song et al.

FOREIGN PATENT DOCUMENTS

CN          2609039          3/2004
CN          2609039 Y  *    3/2004

* cited by examiner

*Primary Examiner*—Uyen Chau N Le
*Assistant Examiner*—Kajli Prince
(74) *Attorney, Agent, or Firm*—McKenna Long & Aldridge LLP

(57) ABSTRACT

An LCD device is disclosed, which is suitable for designing a pad for a fine pitch to decrease a pad and a data TCP of a data driver in size, the LCD device including: an LCD panel that includes upper and lower substrates and a liquid crystal layer; a gate driving unit that includes a plurality of gate drivers formed corresponding to an edge area of the lower substrate; a data driving unit that includes a plurality of data drivers connected with a source PCB and the lower substrate by respective data TCPs; and a plurality of data pads that are arranged at fixed intervals on the data TCP so as to transmit a data signal of the data driving unit to a data line of the LCD panel, wherein each of the data pads includes first and second parts having different bonding areas.

2 Claims, 7 Drawing Sheets

LIQUID CRYSTAL DISPLAY DEVICE

This application claims the benefit of Korean Patent Application No. P2005-118771, filed on Dec. 7, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device having a pad with a fine pitch so as to decrease the size of a pad and a data TCP for a data driver.

2. Discussion of the Related Art

Demands for various display devices have increased with the development and growth of an information society. Accordingly, many efforts have been made to research and develop various flat display devices such as liquid crystal displays (LCD), plasma display panels (PDP), electroluminescent displays (ELD), and vacuum fluorescent displays (VFD). Some types of flat display devices have already been applied to displays for various equipment.

Among the various flat display devices, liquid crystal display (LCD) devices have been most widely used due to advantageous characteristics such as a thin profile, low weight, and low power consumption, whereby the LCD devices provide a substitute for a cathode ray tube (CRT). In addition to mobile type LCD devices such as a display for a notebook computer, LCD devices have been developed for computer monitors and televisions to receive and display broadcast signals.

Hereinafter, a related art LCD device will be explained with reference to the accompanying drawings.

FIG. 1 is a layout illustrating an LCD device according to the related art. FIG. 2 is a detailed view illustrating a pitch of a data driving unit according to the related art.

As shown in FIGS. 1 and 2, a related art LCD device includes an LCD panel 20 that includes: lower and upper substrates 10 and 11 and a liquid crystal layer (not shown) formed between the lower and upper substrates 10 and 11; a gate driving unit 12 that includes a plurality of gate drivers connected with the lower substrate 11; a data driving unit 15 that includes a plurality of data drivers connected between a source PCB 14 and the lower substrate 11 by respective data TCPs 13; and a seal line 16 formed in the circumference of the lower and upper substrates 10 and 11 to bond the lower and upper substrates 10 and 11 to each other.

The gate driving unit 12 and the data driver unit 15 include a plurality of TCP mounted respective drivers and connected with the lower substrate 11.

Also, a timing controller (not shown) is provided so as to output control signals and video information to the gate driving unit 12 and the data driving unit 15.

The LCD panel 20 includes a pixel area 21 for displaying images.

Also, the lower substrate 11 of the LCD panel 20 includes: a plurality of gate and data lines; a plurality of pixel electrodes; and a plurality of thin film transistors TFTs. In this case, the gate lines cross the data lines to thereby define pixel regions in a matrix configuration. Then, the pixel electrodes are respectively formed in the pixel regions. The plurality of thin film transistors TFTs are formed adjacent to crossing areas of the gate and data lines, wherein each of the thin film transistors TFTs applies a signal of the data line to each of the pixel electrodes according to a signal of the gate line.

The thin film transistor TFT includes a gate electrode protruding from one side of the gate line; a gate insulating layer formed on an entire surface of the lower substrate 11; an active layer overlapped with the gate electrode; a source electrode overlapped with one side of the data line and one side of the gate electrode; and a drain electrode formed at a predetermined interval from the source electrode.

In addition, a passivation layer is formed on the lower substrate 11, wherein the passivation layer has a first contact hole corresponding to the drain electrode. That is, the drain electrode is electrically connected with the pixel electrode by the first contact hole.

Although not shown, the upper substrate 10 includes: a black matrix layer; a color filter layer formed corresponding to the pixel regions; and a common electrode formed corresponding to the pixel electrode.

Then, liquid crystal is provided between the upper and lower substrates 10 and 11. As a voltage is applied to the common electrode and the pixel electrode, the liquid crystal is driven.

Also, a data pad unit 19 is provided in the data TCP 13 of the data driving unit 15, wherein the data pad unit 19 transmits the data signal to the data line of the LCD panel 20.

As show in FIG. 2, the data pad unit 19 has the same pitch on each data TCP 18. That is, the data pad unit 19 is provided with a plurality of data pads 23, wherein the data pads 23 are provided at the same width and interval.

In the drawings, reference number '18' corresponds to a data chip.

However, if the data pads 19 are formed with the same pitch, and each data TCP 13 of the data driving unit 15 is bonded to the pad of the lower substrate 11, it may be misaligned when bonding the lower substrate 11 due to the difference of expansion in the data pad unit 19.

To decrease manufacturing costs, it is necessary to decrease each data TCP 13 of the data driving unit 15 in size and to decrease each pad of the data pad unit 19 in size.

However, if decreasing both the width and interval of the data pad, it may have a short due to the misalignment when bonding the data pad to the LCD panel.

In this respect, it is impossible to infinitely decrease the width and interval of the data pad with current process cababilities.

SUMMARY OF THE INVENTION

Accordingly, the present invention is directed to an LCD device, which substantially obviates one or more problems due to limitations and disadvantages of the related art.

An advantage of the present invention is to provide an LCD device that is suitable for designing a pad with a fine pitch to decrease a pad and a data TCP(or COF) of a data driver in size, to thereby decrease its manufacturing cost.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, an LCD device includes: an LCD panel that includes upper and lower substrates and a liquid crystal layer; a gate driving unit that includes a plurality of gate drivers formed corresponding to an edge area of the lower substrate; a data driving unit that includes a plurality of data drivers connected with a source PCB and the lower substrate by respective data TCPs; and a plurality of data pads that are arranged at fixed intervals on the data TCP so as to transmit a data signal of the data driving unit to a data line of the LCD panel, wherein each of the data pads includes first and second parts having different bonding areas.

In another aspect of the present invention, an LCD device including: an LCD panel that includes upper and lower substrates and a liquid crystal layer; a gate driving unit that includes a plurality of gate drivers formed corresponding to an edge area of the lower substrate; a data driving unit that includes a plurality of data drivers connected with a source PCB and the lower substrate by respective data TCPs; and a plurality of data pads that are arranged at fixed intervals on the data TCP so as to transmit a data signal of the data driving unit to a data line of the LCD panel, wherein each of the data pads includes first and second parts having different bonding areas, wherein each of the data pads is formed by alternating the first part having a large size and the second part having a small size and wherein adjacent data pads are inversely positioned, so that the first part of one data pad is positioned next to the second part of the adjacent data pad.

In another aspect of the present invention, an data driving unit comprising: a plurality of data drivers connected with a source PCB and the lower substrate by respective data TCPs; and a plurality of data pads that are arranged at fixed intervals on the data TCP so as to transmit a data signal of the data driving unit to a data line of the LCD panel, wherein each of the data pads includes first and second parts having different bonding areas. In another aspect of the present invention, an driving unit comprising: a circuit film connected with the display panel and mounted a drive IC; a plurality of first pads that are arranged on the circuit film; and a plurality of second pads that are formed on the display panel corresponding to the plurality of first pads, wherein each of the first and second pads is formed by alternating the first part having a large size and the second part having a small size and wherein adjacent pads are inversely positioned, so that the first part of each pad is positioned next to the second part of the adjacent pad.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

First Embodiment

Figure 1:
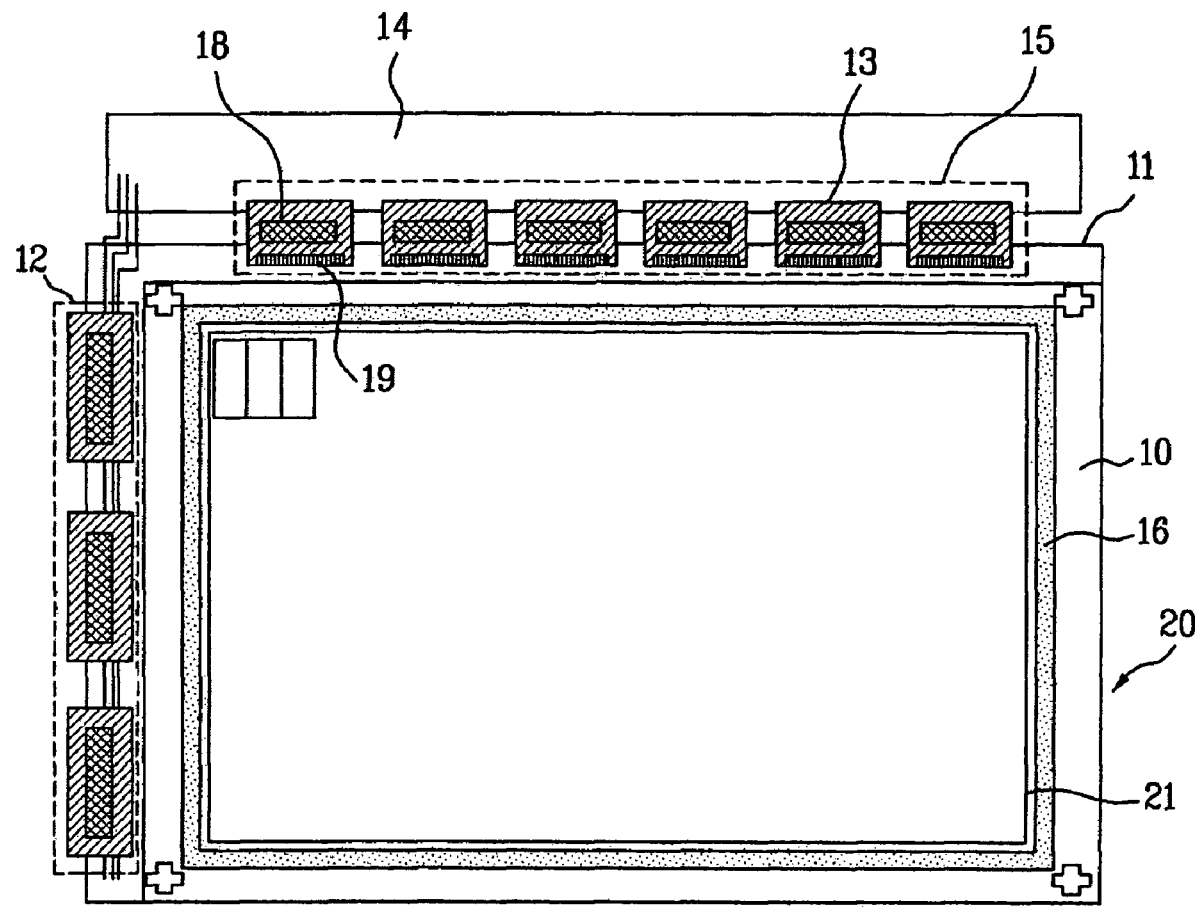
FIG. 1 is a layout illustrating a related art LCD device.
Figure 2:
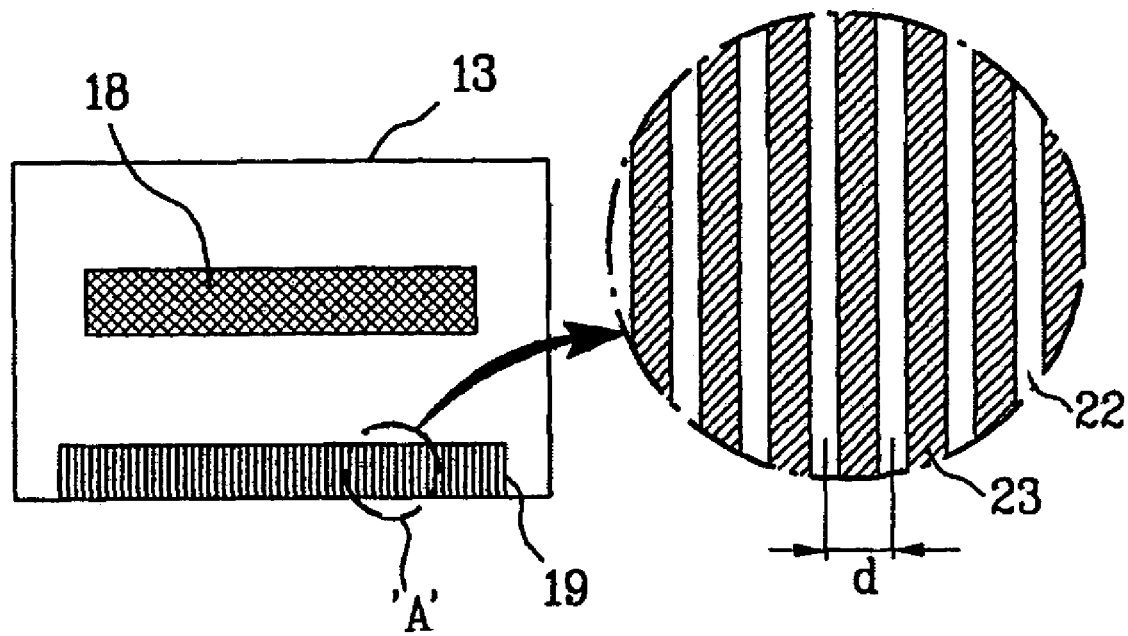
FIG. 2 is a detailed view illustrating a pitch of a data driving unit according to the related art.
Figure 3:
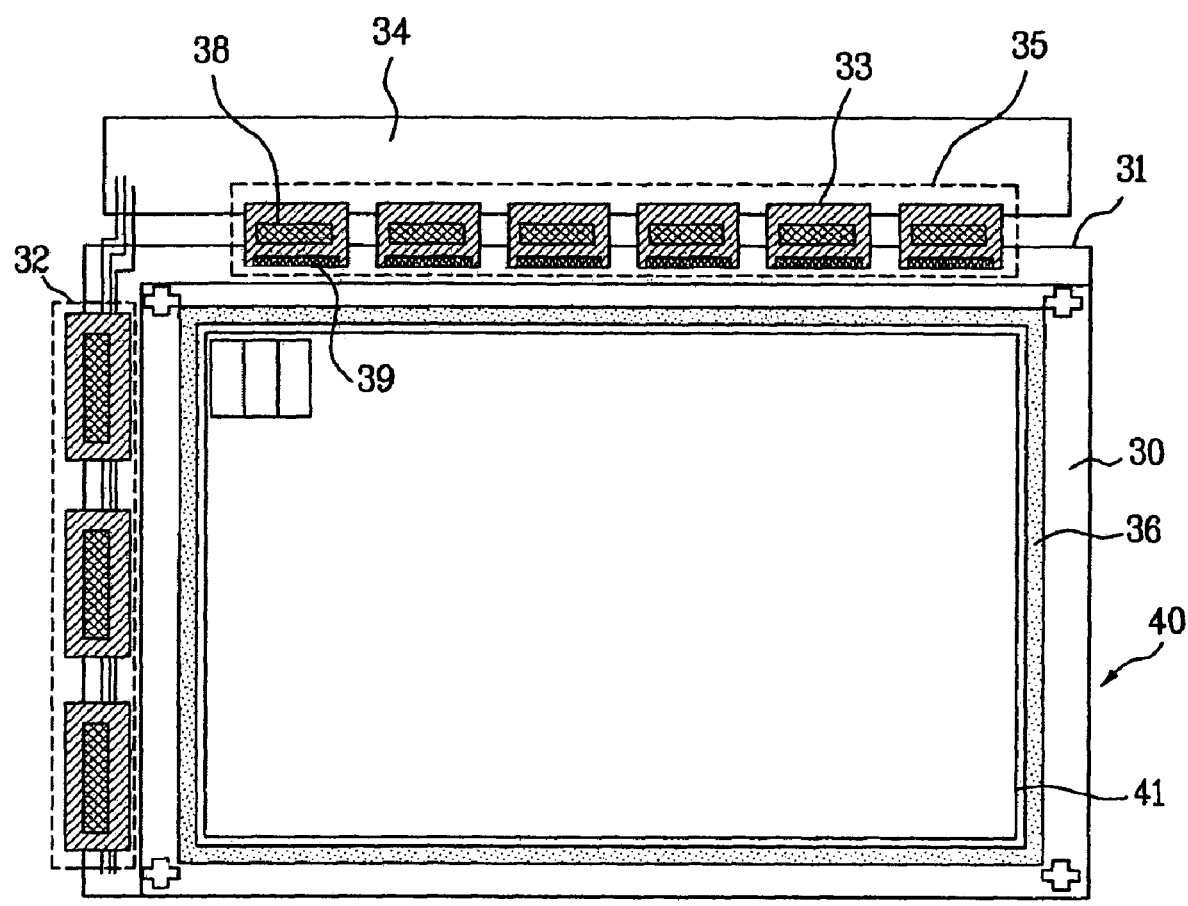
FIG. 3 is a layout illustrating an LCD device according to the preferred embodiment of the present invention.
Figure 4:
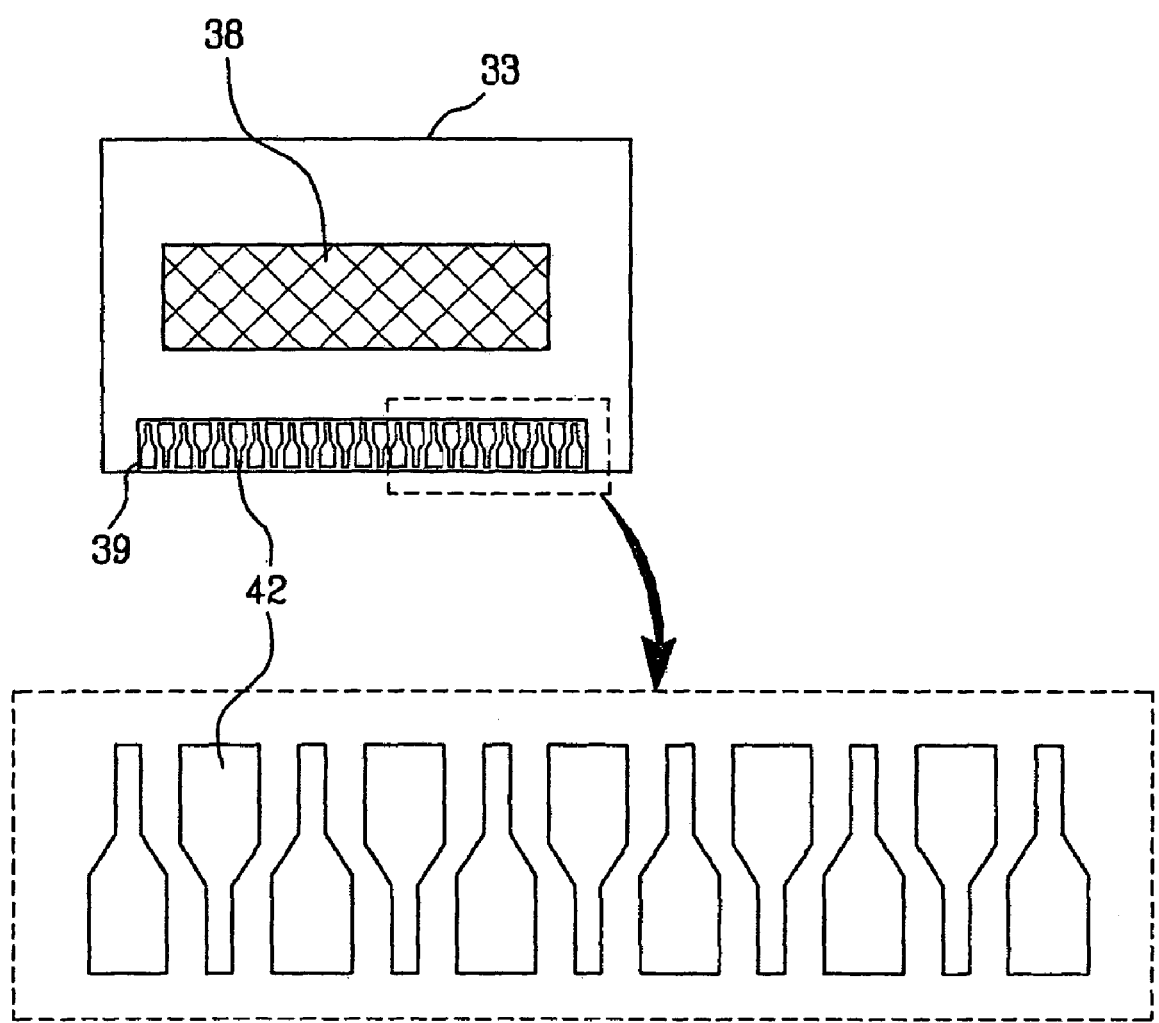
FIG. 4 is a detailed view illustrating a data pad of a data driving unit in various shapes according to the first embodiment of the present invention.

FIG. 3 is a layout illustrating an LCD device according to the preferred embodiment of the present invention. FIG. 4 is a detailed view illustrating a data pad of a data driving unit in various shapes according to the first embodiment of the present invention.

As shown in FIGS. 3 and 4, an LCD device according to the first embodiment of the present invention includes: an LCD panel 40 that includes upper and lower substrates 30 and 31 and a liquid crystal layer (not shown) formed between the upper and lower substrates 30 and 31; a gate driving unit 32, that includes a plurality of gate drivers connected with the lower substrate 31; a data driving unit 35, that includes a plurality of data drivers 38, connected between a source PCB 34 and the low substrate 31 by respective data TCPs 33; and a seal line 36 formed in the circumference of the upper and lower substrates 30 and 31 for bonding of the upper and lower substrates 30 and 31.

The gate driving unit 32 includes a plurality of gate TCP mounted respective gate drivers and connected with the lower substrate 31. The data driving unit 35 includes a plurality of data TCP 33 mounted respective data drivers 38 and connected with the lower substrate 31. Instead of the TCP, circuit film as flexible printed circuit (FPC) or chip-on-film (COF) may be used.

In addition, a timing controller (not shown) is provided in the LCD device, wherein the timing controller outputs control signals and video information to the gate driving unit 32 and the data driving unit 35.

The LCD panel 40 has a pixel area 41 for displaying images.

The lower substrate 31 of the LCD panel 40 includes: a plurality of gate and data lines; a plurality of pixel electrodes; and a plurality of thin film transistors TFTs. In this case, the gate lines cross the data lines, to thereby define pixel regions in a matrix configuration. Then, the pixel electrodes are formed in the pixel regions. The plurality of thin film transistors TFTs are formed adjacent to crossing areas of the gate and data lines, wherein each of the thin film transistors TFTs applies a signal on the data line to each of the pixel electrodes according to a signal of the gate line.

The thin film transistor TFT includes: a gate electrode protruding from one side of the gate line; a gate insulating layer formed on an entire surface of the lower substrate; an active layer overlapping the gate electrode; a source electrode overlapping one side of the data line and one side of the gate electrode; and a drain electrode formed at a predetermined interval from the source electrode.

In addition, a passivation layer is formed on the lower substrate 31, wherein the passivation layer has a first contact hole corresponding to the drain electrode. That is, the drain electrode is electrically connected with the pixel electrode by the first contact hole.

Although not shown, the upper substrate 30 includes: a black matrix layer; a color filter layer formed corresponding to the pixel regions; and a common electrode formed corresponding to the pixel electrode.

Then, liquid crystal is provided between the upper and lower substrates 30 and 31. As a voltage is applied to the common electrode and the pixel electrode, the liquid crystal is driven.

A data pad unit 39 including a plurality of data pads 42 is provided in the data driving unit 35, so as to transmit the data signal to the data line of the LCD panel 40. The plurality of data pads 42 are formed in each data TCP 33 mounted each data driver 38. Also, the data pad unit 39 further includes a plurality of data pads, not shown, which is formed on the lower substrate 31 corresponding to the plurality of data pads 42 of the data TCP 33. Each data pad 42 of the data TCP 33 has same shape with each data pad of the lower substrate 31.

To decrease the manufacturing cost associated with the decreased size of the data TCP 33 of the data driving unit 35, the data pads 42 of the data pad unit 39 are formed at predetermined intervals on the data TCP 33, as shown in FIG. 4.

In detail, the data pad unit 39 is provided with the plurality of data pads 42. Each data pad 42 is formed in shape of a funnel having a first part of large size and a second part of small size, as shown in FIG. 4.

When arranging the data pads 42 at fixed intervals, adjacent data pads 42 are inversely positioned, that is, the adjacent two data pads 42 are in an inverse position in an up and down direction. Thus, the data pads 42 are arranged such that the first part of one data pad is positioned next to the second part of the adjacent data pad.

To prevent a short caused by the misalignment in the bonding process of the data pad 42, the data pads 42 are arranged at the fixed intervals.

Referring to FIG. 4, the first part of the large size of the data pad 42 is formed in the shape of a rectangle. Also, the width of the second part of the data pad 42 corresponds to the width of the related art pad.

Even though the data pads 42 are formed at fixed intervals, it is possible to decrease the entire area of the data pad unit 39 in size.

Although not shown, the first part of the large size of the data pad 42 may be formed in the shape of a triangle, an octagon, a diamond, or a circle.

Second Embodiment

Figure 5:
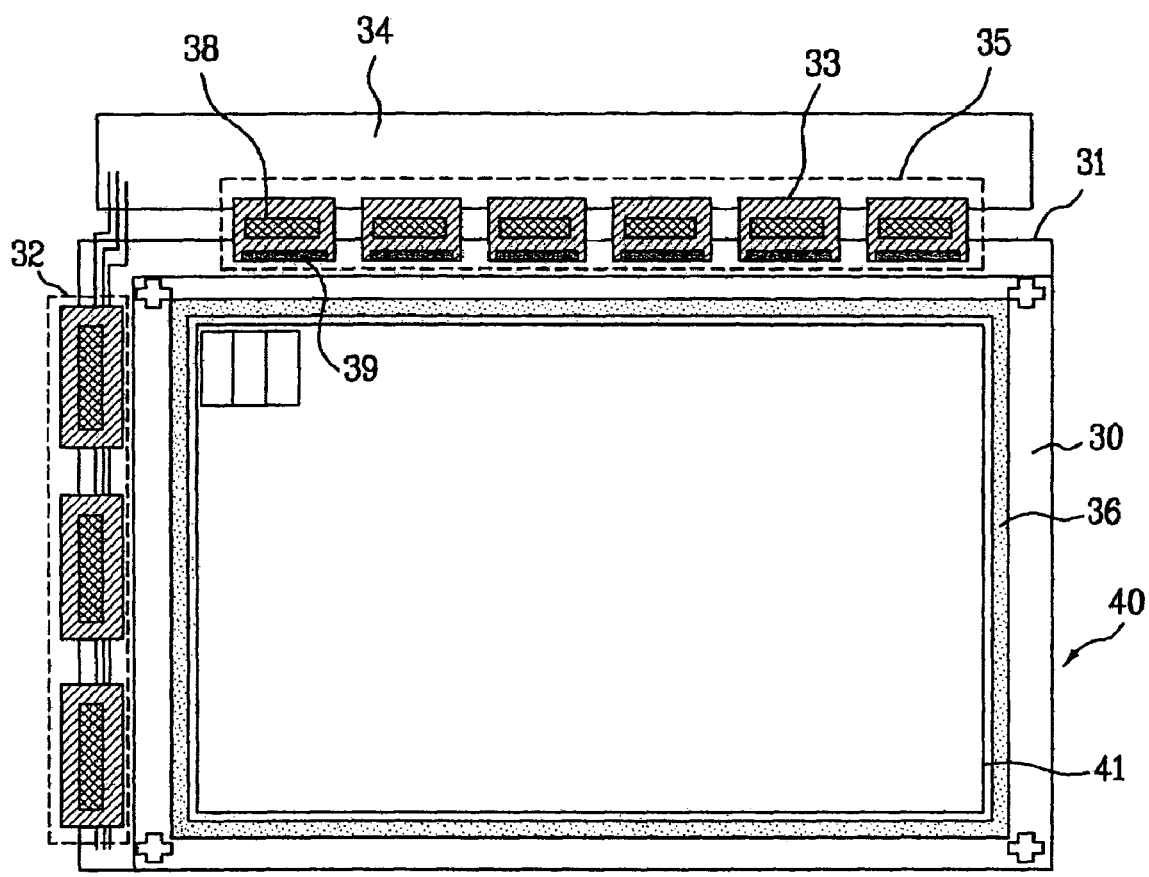
FIG. 5 is a layout illustrating an LCD device according to the second embodiment of the present invention.
Figure 6:
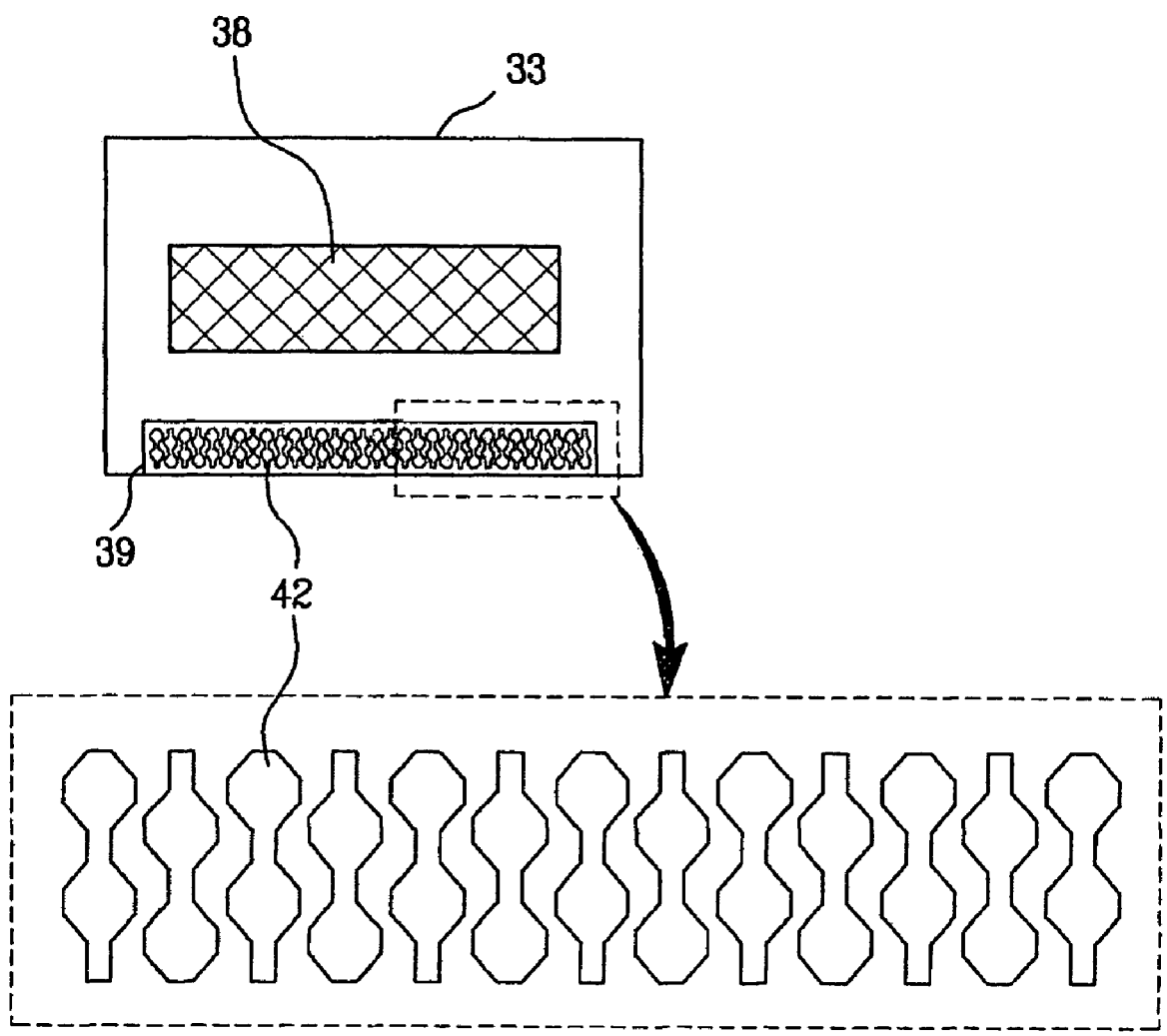
FIGS. 6 and 7 are detailed views illustrating a data pad of a data driving unit in various shapes according to the second embodiment of the present invention.
Figure 7:
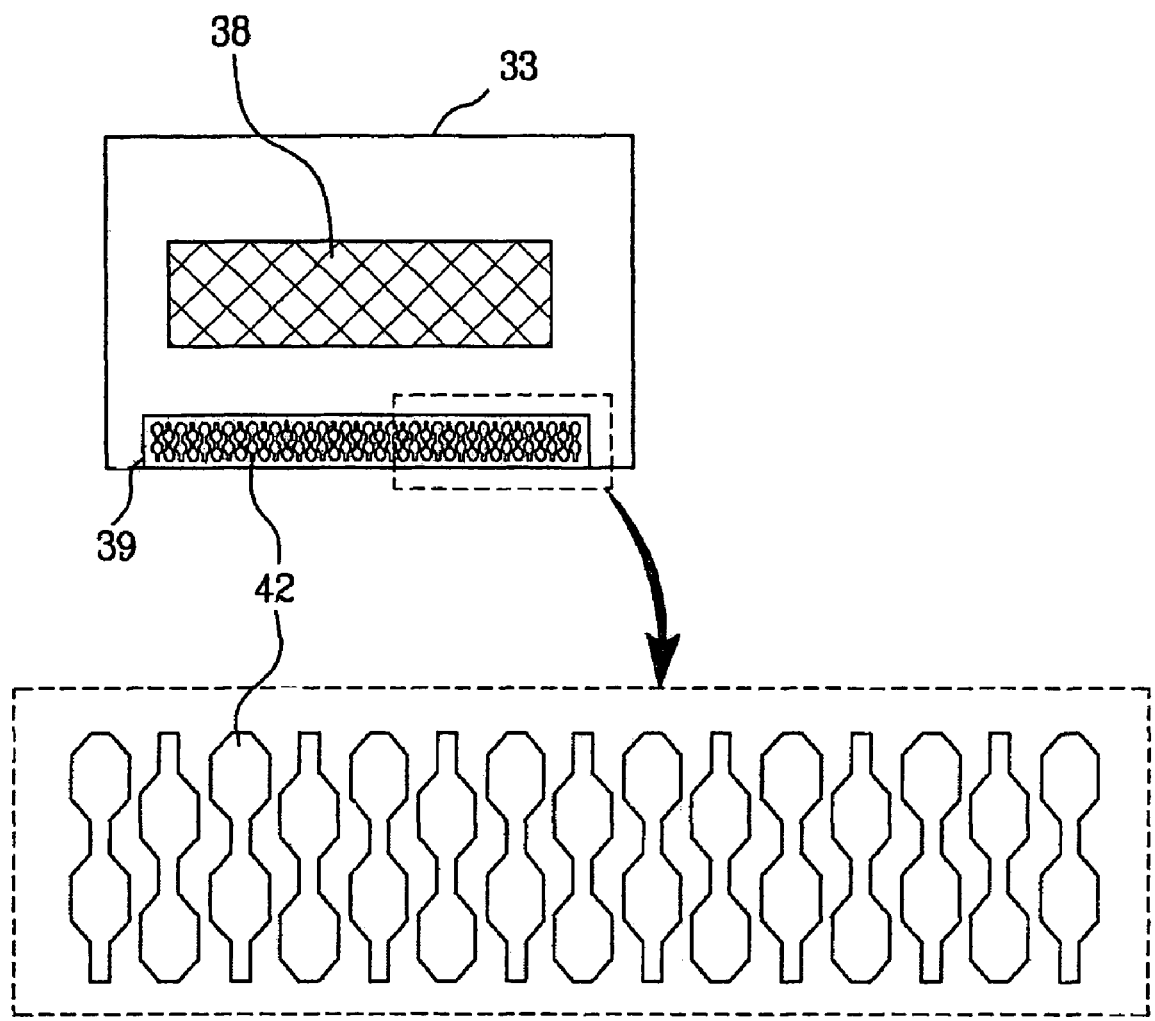

FIG. 5 is a layout illustrating an LCD device according to the second embodiment of the present invention. FIGS. 6 and 7 are detailed views illustrating a data pad of a data driving unit in various shapes according to the second embodiment of the present invention.

Except for the structure of a data pad unit, an LCD device according to the second embodiment of the present invention is identical in structure to the LCD device according to the first embodiment of the present invention. Thus, the data pad unit of the LCD device according to the second embodiment of the present invention will be explained in detail.

First, as shown in FIGS. 6 and 7, the data pad unit 39 of the LCD device according to the second embodiment of the present invention is provided with a plurality of data pads 42. The data pads 42 are arranged at fixed intervals on each data TCP 33. Each data pad 42 is comprised of first and second parts, wherein the first part is formed in a large size and the second part is formed in a small size. In this case, at least two of the first part is provided to each data pad 42.

Each data pad 42 is made by alternating the first and second parts, as shown in FIGS. 6 and 7. Also, when positioning the plurality of data pads 42 at the fixed intervals, the first part of one data pad is provided corresponding to the second part of the adjacent data pad.

As shown in FIGS. 6 and 7, the first part of the data pad 42 is formed in shape of an octagon. As shown in FIG. 7, the first part of the data pad 42 may be formed in an irregular octagon. However, it is preferable to form the first part of the data pad 42 in shape of a regular octagon, to thereby obtain a maximum bonding area.

Also, each data pad 42 has at least two of the first part for the bonding area, so that it is possible to enhance the bonding efficiency.

Although not shown, the first part of the data pad 42 may be formed in various shapes including a triangle, a rectangle, a diamond, and a circle.

When arranging the data pads 42 at fixed intervals, the adjacent data pads 42 are inversely positioned, that is, the adjacent two data pads 42 are in an inverse position in an up and down direction. Thus, the data pads 42 are arranged such that the first part of one data pad is positioned next to the second part of the adjacent data pad.

Also, the width of the first part of the data pad 42 corresponds to the width of the related art pad.

Even though the data pads 42 are formed at fixed intervals, it is possible to decrease the entire area of the data pad unit 39 in size, thereby minimizing the problem generated by the misalignment.

Also, the structure of the data pads 42 can be applied to the structure of the data pads of the lower substrate 31, or gate pads of the gate TCP and lower substrate 31.

Accordingly, the LCD device according to the present invention has the following advantages.

First, the data pad is formed by alternating the first and second parts of the different sizes. Thus, even though the data pads are arranged at the fixed intervals, it is possible to decrease the entire size of the data pad unit. That is, it is suitable for designing the pad with a fine pitch.

Even though the size of the data TCP decreases, it is possible to provide the data pads at the fixed intervals, to thereby prevent the misalignment on the fine pitch, and to improve the quality of the LCD device.

Also, it is possible to decrease the manufacturing cost owing to the decreased size of the data TCP.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
   an LCD panel that includes upper and lower substrates and a liquid crystal layer;
   a gate driving unit that includes a plurality of gate drivers connected with the lower substrate;
   a data driving unit that includes a plurality of data drivers connected with the lower substrate by respective data circuit films;
   a plurality of first data pads that are arranged at fixed intervals on each of the data circuit films so as to transmit data signals from each of the data drivers of the LCD panel; and a plurality of second data pads formed on the lower substrate of the LCD panel and connected with data lines of the lower substrate, wherein each of the second data pads has a same shape with each of the first data pads, wherein each of the first and second data pads includes at least two of first bonding areas having a large size and two of second bonding areas having a small size than the first bonding areas, each first bonding area and each second bonding area alternating with each other, wherein adjacent pads are inversely positioned so that the at least two first bonding areas of each pad is positioned next to the second bonding areas of the adjacent pad wherein the first bonding area has one of a triangle, a diamond, an octagon and a circle shape.

2. The LCD device of claim 1 wherein the circuit film is one of TCP, COF and FPC.

* * * * *